US009177232B2

(12) United States Patent
Yamamoto et al.

(10) Patent No.: US 9,177,232 B2
(45) Date of Patent: Nov. 3, 2015

(54) INFORMATION PROCESSING DEVICE, METHOD OF PROCESSING INFORMATION, AND COMPUTER-READABLE RECORDING MEDIUM FOR EXTRACTING A CONTOUR OF AN OBJECT (71) Applicants: Hiroki Yamamoto, Tokyo (JP); Masahide Horiuchi, Tokyo (JP); Fumiko Tsuwano, Tokyo (JP); Youhei Yamane, Tokyo (JP)

(72) Inventors: Hiroki Yamamoto, Tokyo (JP); Masahide Horiuchi, Tokyo (JP); Fumiko Tsuwano, Tokyo (JP); Youhei Yamane, Tokyo (JP)

(73) Assignee: RICOH COMPANY, LIMITED, Tokyo (JP)

( * ) Notice: Subject to any disclaimer, the term of this patent is extended or adjusted under 35 U.S.C. 154(b) by 0 days.

(21) Appl. No.: 14/531,168

(22) Filed: Nov. 3, 2014

(65) Prior Publication Data
US 2015/0131127 A1    May 14, 2015

(30) Foreign Application Priority Data

Nov. 8, 2013    (JP) .................................. 2013-232558

(51) Int. Cl.
G06K 15/00    (2006.01)
G06K 15/02    (2006.01)
G06K 15/14    (2006.01)

(52) U.S. Cl.
CPC .............. G06K 15/188 (2013.01); G06K 15/14 (2013.01)

(58) Field of Classification Search
None
See application file for complete search history.

(56) References Cited

U.S. PATENT DOCUMENTS

| 5,357,602 | A  | * | 10/1994 | Ohta | 345/442 |
|---|---|---|---|---|---|
| 5,617,487 | A  | * | 4/1997 | Yoneyama et al. | 382/199 |
| 6,055,337 | A  | * | 4/2000 | Kim | 382/242 |
| 6,654,497 | B1 | * | 11/2003 | Kondo et al. | 382/199 |
| 8,131,076 | B2 | * | 3/2012 | Jolly et al. | 382/173 |
| 8,274,597 | B2 | * | 9/2012 | Chang et al. | 348/349 |
| 2003/0063802 | A1 | * | 4/2003 | Li et al. | 382/199 |
| 2011/0242348 | A1 | * | 10/2011 | Yana | 348/222.1 |
| 2012/0062736 | A1 | * | 3/2012 | Xiong | 348/143 |
| 2013/0083982 | A1 | * | 4/2013 | Nakamura | 382/128 |
| 2013/0155475 | A1 | * | 6/2013 | Chen et al. | 358/531 |
| 2013/0330009 | A1 | * | 12/2013 | Pan et al. | 382/199 |
| 2015/0124295 | A1 | * | 5/2015 | Yamane et al. | 358/2.1 |

FOREIGN PATENT DOCUMENTS

| JP | 09-091443 | 4/1997 |
|---|---|---|
| JP | 2008-242650 | 10/2008 |
| JP | 2012-059271 | 3/2012 |
| JP | 2013-196308 | 9/2013 |

* cited by examiner

Primary Examiner — Dung Tran
(74) Attorney, Agent, or Firm — Oblon, McClelland, Maier & Neustadt, L.L.P.

(57) ABSTRACT

An information processing device includes a receiving unit, a processing range determination unit, and a contour extraction unit. The receiving unit receives specified position information that indicates a position specified by a user with respect to a target image. The processing range determination unit determines, when a distance between a start point position that indicates a start point of positions indicated by the specified position information, and a position indicated by the latest specified position information is a threshold or less, a closed area obtained based on a history of the received specified position information as a processing range. The contour extraction unit extracts a contour of an object in the processing range.

7 Claims, 11 Drawing Sheets

IMAGE DATA FOR COLOR PLATE

FIG.3

| TYPE OF GLOSS EFFECT | GLOSS | DEVIATION |
|---|---|---|
| SPECULAR GLOSS (PG) | Gs≥80 | ΔGs≤10 |
| SOLID GLOSS (G) | Gs=Gs (SOLID GLOSS) | ΔGs≤10 |
| HALFTONE-DOT MATT (M) | Gs=Gs (1C 30% HALFTONE-DOT) | ΔGs≤10 |
| MATTING (PM) | Gs≤10 | ΔGs≤10 |

FIG.4

IMAGE DATA FOR GLOSS CONTROL PLATE

▨ : AREA TO WHICH PG IS SPECIFIED (DENSITY VALUE 98%)

▨ : AREA TO WHICH G IS SPECIFIED (DENSITY VALUE 90%)

▤ : AREA TO WHICH M IS SPECIFIED (DENSITY VALUE 16%)

INFORMATION PROCESSING DEVICE, METHOD OF PROCESSING INFORMATION, AND COMPUTER-READABLE RECORDING MEDIUM FOR EXTRACTING A CONTOUR OF AN OBJECT

CROSS-REFERENCE TO RELATED APPLICATIONS

The present application claims priority to and incorporates by reference the entire contents of Japanese Patent Application No. 2013-232558 filed in Japan on Nov. 8, 2013.

BACKGROUND OF THE INVENTION

1. Field of the Invention

The present invention relates to an information processing device, a method of processing information, and a computer-readable recording medium.

2. Description of the Related Art

In recent years, technologies of performing printing with a special color ink such as a clear toner have been increasing. In the printing with a special color ink, an object (hereinafter, a special color object) to be printed with the special color ink is arranged on an existing object on an original copy. This enables the printing with the special color ink.

To create a special color object, it is necessary to accurately extract a contour from an object on a target original copy. For example, JP 9-91443 A discloses a technology of drawing a polygon (extraction starting line) that roughly surrounds a target image, and executing contour extraction processing based on the drawn polygon.

However, conventionally, there is no mechanism of improving work efficiency of when a processing range of the contour extraction processing is determined. The present invention has been made in view of the foregoing, and there is a need for an information processing device, a method of processing information, and a computer-readable recording medium capable of improving the work efficiency of when the processing range of the contour extraction processing is determined.

SUMMARY OF THE INVENTION

It is an object of the present invention to at least partially solve the problems in the conventional technology.

The present invention provides an information processing device that includes a receiving unit configured to receive specified position information indicating a position specified by a user with respect to a target image; a processing range determination unit configured to determine, when a distance between a start point position indicating a start point of positions indicated by the specified position information sequentially received in the receiving unit, and a position indicated by latest specified position information is a threshold or less, a closed area obtained based on a history of the received specified position information, as a processing range; and a contour extraction unit configured to extract a contour of an object in the processing range.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, embodiments of an information processing device, a method of processing information, and a computer-readable recording medium according to the present invention will be described in detail with reference to the appended drawings.

First, a configuration of an image forming system of the present embodiment will be described with reference to FIG. 1.

Figure 1:
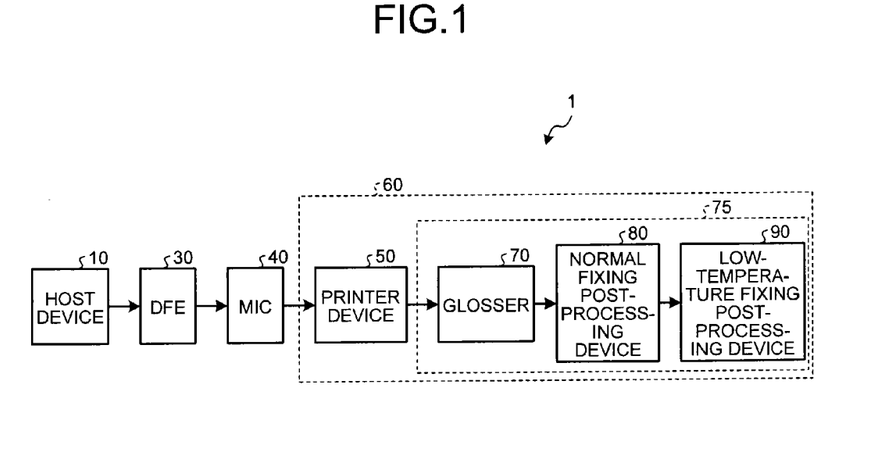
FIG. 1 is a diagram illustrating an example of a configuration of an image forming system.

As illustrated in FIG. 1, an image forming system 1 of the present embodiment includes a host device 10, a printer control device (digital front end) (hereinafter, referred to as DFE) 30, an interface controller (mechanism I/F controller) (hereinafter, may be referred to as MIC) 40, and a printing device 60. The host device 10, the DFE 30, the MIC 40, and the printing device 60 are mutually connected through a wired or wireless communication line in a data-transferable manner.

The DFE 30 performs communication with the printing device 60 through the MIC 40, and controls formation of an image in the printing device 60. Further, the host device 10 such as a personal computer (PC) is connected to the DFE 30. The DFE 30 receives image data from the host device 10. The DFE 30 then generates, using the image data, image data for the printing device 60 to form a toner image according to CMYK toners and a clear toner. Further, the DFE 30 transmits the generated image data to the printing device 60 through the MIC 40.

In the example of FIG. 1, the printing device 60 is configured to include a printer device 50 and a post-processing device 75. In the printer device 50, the CMYK toners and the clear toner are at least mounted, and an image formation unit including a photoconductor, a charging device, a developing device, and a photoconductor cleaner, and an exposure device are mounted for each toner. The printer device 50 emits a light beam from the exposure device to form a toner image on the photoconductor according to the respective toners, and transfers the toner image on a recording medium such as a recording paper, according to the image data transmitted from the DFE 30 through the MIC 40. The transferred toner image is applied heat and pressure at a temperature within a predetermined range (normal temperature) in a fixing device (not illustrated) and fixed on the recording medium. Accordingly, an image is formed on the recording medium.

Here, the clear toner is a transparent (colorless) toner not including a color material. Note that transparent (colorless) indicates that the transmittance is, for example, 70% or more.

In the example of FIG. 1, the post-processing device 75 is configured to include a glosser 70 connected to the printer device 50, a normal fixing post-processing device 80 connected to the glosser 70, and a low-temperature fixing post-processing device 90 connected to the normal fixing post-processing device 80. However, the post-processing device 75 is not limited thereto, and can employ various known configurations. ON and OFF of the glosser 70 are controlled by the DFE 30, and when the glosser 70 is turned ON, the glosser 70 re-fixes the image formed on the recording medium by the printer device 50. Accordingly, a total adhesion amount of toners of pixels to which a predetermined amount or more of the toners adheres becomes uniformly compressed in the entire image formed on the recording medium.

The clear toner and the fixing device for fixing the clear toner are mounted on the normal fixing post-processing device 80, and image data for clear toner plate (image data for forming a toner image according to the clear toner) generated by the DFE 30 is input to the normal fixing post-processing device 80. The normal fixing post-processing device 80 superimposes the toner image by the clear toner on the image pressurized by the glosser 70 and formed on the recording medium, using the input image data for clear toner plate. The toner image formed on the recording medium is then applied heat and pressure at a normal temperature in the fixing device and fixed on the recording medium.

The clear toner and the fixing device for fixing the clear toner are mounted on the low-temperature fixing post-processing device 90, and image data for clear toner plate generated by the DFE 30 is input to the low-temperature fixing post-processing device 90. The low-temperature fixing post-processing device 90 superimposes the toner image by the clear toner on the image pressurized by the glosser 70 and the normal fixing post-processing device 80 and formed on the recording medium, using the input image data for clear toner plate. The toner image formed on the recording medium is then applied heat and pressure at a lower temperature (low temperature) than the normal temperature in the fixing device and fixed on the recording medium.

Here, the image data output from the host device 10 to the DFE 30 will be described.

The host device 10 generates original copy data in which special color plate information (image data for special color plate described below) is added to image data for color plate according to specification of the user. The special color plate is image data for causing special toners or inks such as white, gold, and silver to adhere, in addition to basic colors such as CMYK, and is data for printers in which such special toners or inks are mounted. As the special color plate, R may be added to the CMYK basic colors or Y may be added to RGB basic colors, in order to improve color reproducibility. Typically, the clear toner has been treated as one of the special colors. In the image forming system 1 of the present embodiment, a transparent developer that is a clear toner as a special color is used in addition to color developers that are toners of the CMYK basic colors. The image forming system 1 of the present embodiment executes a plurality of different types of transparent processing (may sometimes be referred to as clear processing) by using the clear toner. As the clear processing, there are processing of forming a gloss effect (may sometimes be referred to as surface effect) that is visual or tactile effect provided to a paper and processing of forming a transparent image, using the clear toner. As the clear processing, various known technologies can be used.

Figure 2:
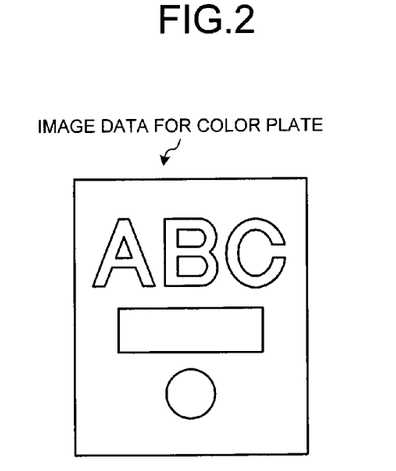
FIG. 2 is a diagram illustrating an example of image data for color plate.

The image data for color plate is image data that defines an image to be formed with a color developer of a color toner. To be specific, the image data for color plate is image data that defines color density values of the RGB, CMYK, or the like, for each drawing area. FIG. 2 is an explanatory diagram illustrating an example of the image data for color plate. In FIG. 2, the density value corresponding to a color specified by the user is provided for each drawing area (object) such as "A", "B", or "C". The density value of each drawing area is represented by a density value of 0 to 100%, for example (may be represented by "0" to "255", or the like).

The image data for special color plate is data that defines a transparent area to be realized using the clear toner. The image data for special color plate includes image data for gloss control plate and image data for clear plate. These image data for gloss control plate and the image data for clear plate are generated based on specification of the user. The image data for gloss control plate is image data that defines a gloss effect to be provided to a paper. Specifically, the image data for gloss control plate is image data that identifies an area to which the gloss effect is provided and a type of the gloss effect, in order to perform adhesion control of the clear toner according to the gloss effect that is visual or tactile effect to be provided to a paper. The image data for clear plate is image data that identifies a transparent image of a water mark, texture, or the like other than the above-described gloss effects. Note that, hereinafter, a case of using only the image data for gloss control plate as the image data for special color plate will be described as an example.

In the image data for gloss control plate, the density value of a gloss area (drawing area) that indicates an area to which the clear toner is provided is represented by the density value of 0 to 100% (may be represented by "0" to "255", or the like), similarly to the image data for color plate of the RGB, CMYK, or the like, and the type of the gloss effect is associated with the density value.

Here, as the types of the gloss effects, there are roughly one related to presence or absence of gloss, surface protection, a watermark with embedded information, and texture. As for the gloss effect related to the presence or absence of gloss, there are roughly four types, as exemplarily illustrated in FIG. 3, including specular gloss (premium gross (PG)), solid gloss (gross (G)), halftone-dot matt (matt (M)), and matting (premium matt (PM)) in descending order of the degree of gloss (glossiness). Hereinafter, the specular gloss may be referred to as "PG", the solid gloss may be referred to as "G", the halftone-dot matt may be referred to as "M", and the matting may be referred to as "PM".

Figure 3:
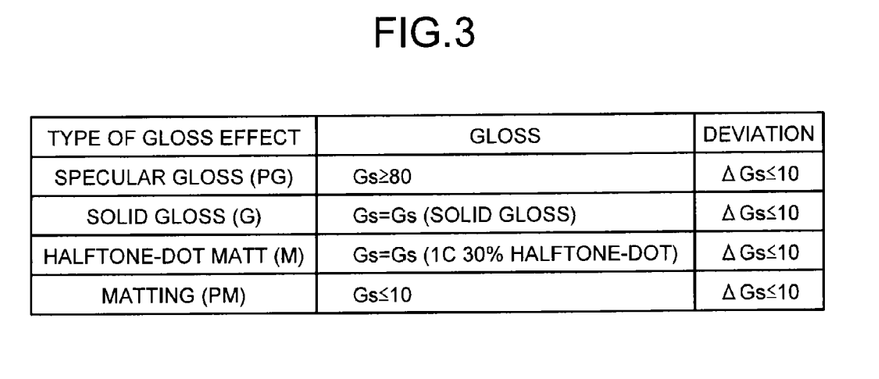
FIG. 3 is a diagram exemplarily illustrating types of gloss effects.

The specular gloss and the solid gloss have a high degree of providing gloss. In contrast, the halftone-dot matt and the matting suppress gloss, and especially, the matting realizes glossiness lower than that of a normal paper. In the drawing, the specular gloss indicates glossiness Gs of 80 or more, the solid gloss indicates solid glossiness made by a primary color or a secondary color, the halftone-dot matt indicates glossiness of a primary color and halftone-dot of 30%, and the matting indicates glossiness of 10 or less. Further, a deviation of the glossiness is represented by ΔGs, and is 10 or less.

For the respective types of the gloss effects, a high density value is associated with the gloss effect having a high degree of providing gloss, and a low density value is associated with the gloss effect that suppresses gloss. The gloss effect of the watermark, texture, or the like is associated with an intermediate density value. As the watermark, a character, a background pattern, or the like is used. The texture expresses a character or a pattern, and can provide a tactile effect, in addition to a visual effect. For example, a stained glass pattern can be realized by the clear toner. The specular gloss or the solid gloss is used as a substitute for the surface protection.

Note that to which object (drawing area) in the image data for color plate the gloss effect is provided, and which type of the gloss effect is provided to the object are determined according to specification of the user. The host device 10 sets the density value corresponding to the gloss effect specified by the user to each drawing area that serves as a target to which the gloss effect is provided, thereby to generate image data for gloss control plate in a vector format.

Figure 4:
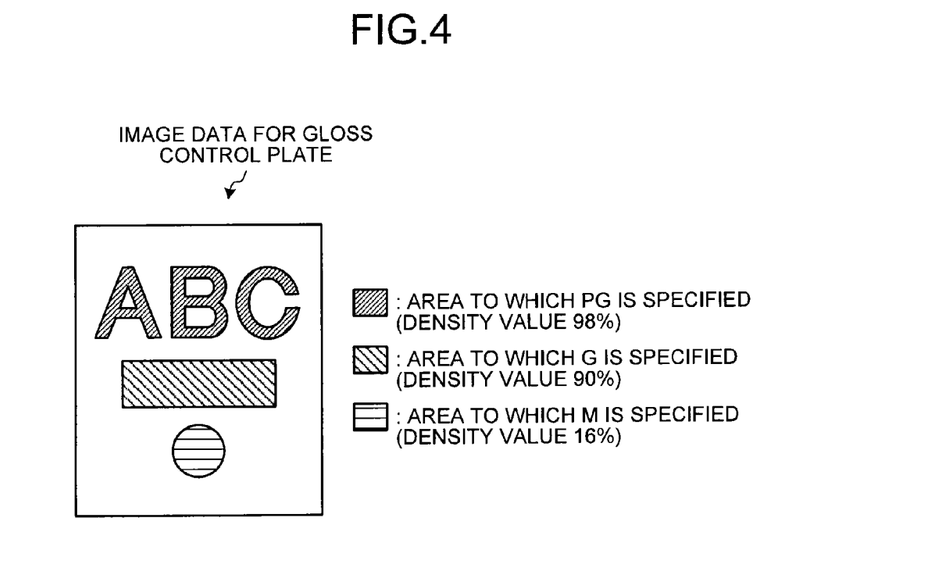
FIG. 4 is a diagram illustrating image data for gloss control plate as an image.

FIG. 4 is an explanatory diagram illustrating an example of the image data for gloss control plate. The example of the image data for gloss control plate of FIG. 4 illustrates that the gloss effect "PG (specular gloss)" is provided to a drawing areas "ABC", the gloss effect "G (solid gloss)" is provided to a drawing area "(rectangular figure)", and the gloss effect "M (halftone-dot matt) is provided to a drawing area "(circular figure)", according to specification of the user.

The image data for color plate and the image data for gloss control plate are generated in a portable document format (PDF) in page units, and these image data for color plate and the image data for gloss control plate are integrated and the original copy data is generated. The generated original copy data is then transmitted to the DFE 30. Note that the data format of image data for each plate is not limited to the PDF, and an arbitrary format can be used.

Here, in the present embodiment, when specifying an object to which the user wishes to provide a gloss effect, the user needs to perform work of roughly surrounding the object. An application (may be referred to as "object specifying application" in the description below) used for specifying an object to which the user wishes to provide a gloss effect is mounted on the host device 10 of the present embodiment, and functions provided by the object specifying application includes a function to improve efficiency of the work. Hereinafter, functions that the host device 10 has will be described, focusing on the function related to the object specifying application. Note that, in this example, the host device 10 can be considered to correspond to an "information processing device" of Claims.

Figure 5:
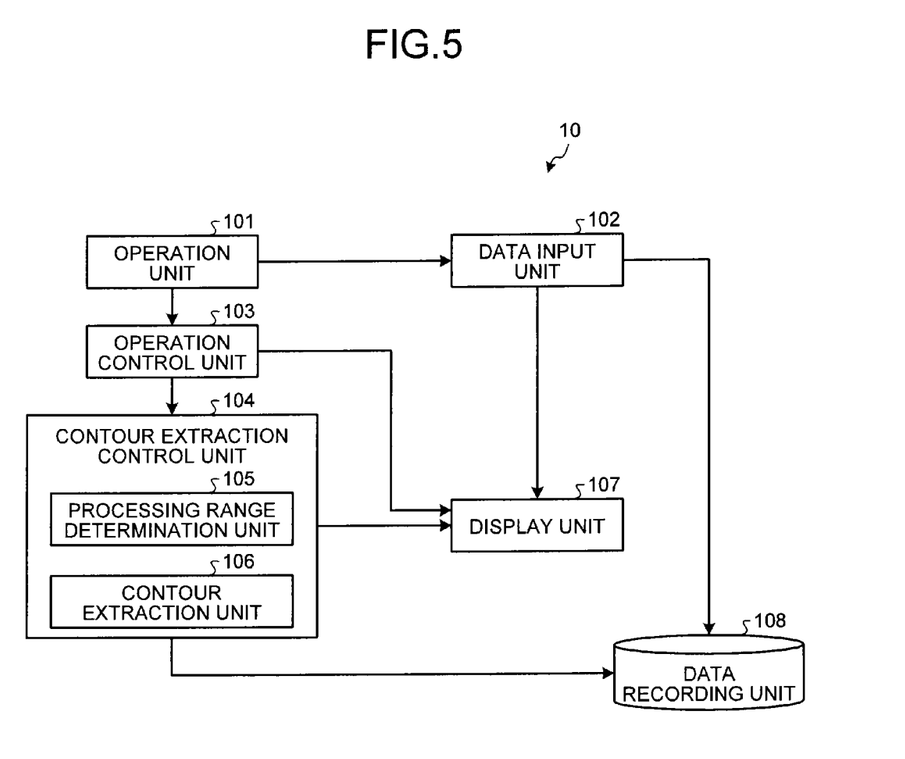
FIG. 5 is a diagram illustrating an example of a functional configuration of a host device.

FIG. 5 is a block diagram illustrating an example of a functional configuration of the host device 10. As illustrated in FIG. 5, the host device 10 includes an operation unit 101, a data input unit 102, an operation control unit 103, a contour extraction control unit 104, a display unit 107, and a data recording unit 108.

The operation unit 101 is an input device used by the user for inputting various instructions and various types of setting, and can be configured with a keyboard, a mouse, or the like, for example. Hereinafter, a case in which the operation unit 101 is configured with a mouse will be described as an example.

Figure 6:
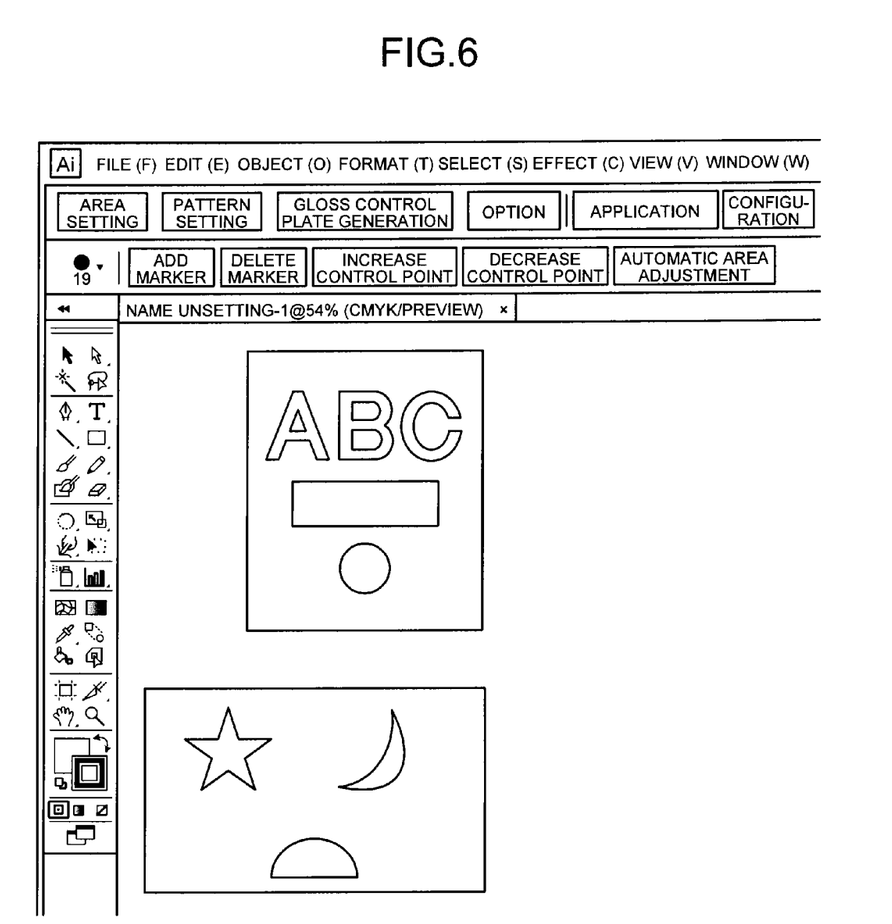
FIG. 6 is a diagram illustrating an example of a screen displayed by an image processing application.

The data input unit 102 reads electronic data (such as image data for color plate stored in a memory (not illustrated)) specified according to an operation of the operation unit 101 from a memory (not illustrated), and records the read electronic data in the data recording unit 108. Further, the data input unit 102 performs control of converting the read electronic data into preview display data in a data format that can be treated in the display unit 107, and displaying the converted data in the display unit 107. In this example, the data input unit 102 displays, in the display unit 107, a screen exemplarily illustrated in FIG. 6. FIG. 6 is an example of a screen displayed when a plug-in is incorporated in Illustrator sold by Adobe Systems (R) Incorporated. The screen illustrated in FIG. 6 displays an image (may be referred to as "target image" in the description below) displayed with the image data for color plate (image data to be processed with which an area to which the gloss effect is to be provided is specified) specified by the user through the operation unit 101.

Referring back to FIG. 5, and description will be continued. The operation control unit 103 converts an operation received from the operation unit 101 into available event information, and notifies the event information to the contour extraction control unit 104. The event information can be also considered as information that can identify the operation of the user. In this example, the user operates a mouse while confirming the target image displayed in the display unit 107, moves a mouse cursor that indicates a current location of a mouse input to an arbitrary position on the target image, and performs a click operation, thereby to specify the arbitrary position. The event information in this case is information that includes at least specified position information that indicates the position specified by the user with respect to the target image, and may be information that includes information that identifies a mouse operation of the user and the specified position information, for example. Further, here, the position of the mouse cursor in a state where the user does not perform the click operation (in state where the user does not perform an operation to specify the arbitrary position on the target image) can be considered to indicate a position, in the target image displayed in the display unit 107, currently pointed at by the user (which is distinguished from a "position specified by the user"), as well.

Further, the operation control unit 103 can also perform control of displaying various images in the display unit 107 according to a user operation received from the operation unit 101. For example, in FIG. 6, when the user presses a button image (not illustrated) for selecting the object specifying application trough the operation unit 101, the operation control unit 103 performs control of displaying a UI image related to the object specifying application in the display unit 107. When the button image for selecting the object specifying application has been pressed, the object specifying application is executed (started), and the user performs an operation input through the operation unit 101, thereby to specify an object to which the user wishes to provide a gloss effect in the image data for color plate. Then, when the user has performed an operation of specifying a type of the gloss effect to be provided, with respect to the specified object, the host device 10 determines the type of the gloss effect to be provided to the object according to the specification of the user, and generates data for gloss control plate.

Referring back to FIG. 5, and description will be continued. The contour extraction control unit 104 includes a processing range determination unit 105 and a contour extraction unit 106. Further, the contour extraction control unit 104 has a function to receive the event information from the operation control unit 103 (that is, a function to receive the specified position information). In this example, the contour extraction control unit 104 can be regarded to have a function corresponding to a "receiving unit" of Claims.

When a distance between a start point position indicating a start point of positions indicated by the specified position information sequentially received from the operation control unit 103, and a position indicated by latest specified position information is a threshold or less, the processing range determination unit 105 determines a closed area obtained based on a history of the received specified position information, as a processing range. In the present embodiment, when the distance between the start point position, and the position indicated by the latest specified position information is the threshold or less, the processing range determination unit 105 replaces the position indicated by the latest specified position information with the start point position. The processing range determination unit then determines a closed area obtained by linking from the start point position to positions indicated by the specified position information received until receiving the latest specified position information, in sequence, as the processing range.

Further, when a distance between the start point position, and a position of the mouse cursor in a state where the user does not perform the click operation (a position currently pointed at by the user, of the target image) is a threshold or less, the processing range determination unit 105 performs control of notifying the fact that the distance is the threshold or less. As described below, in this example, the processing range determination unit 105 performs control of changing display of the mouse cursor (for example, changing the color or the shape) when the distance between the start point position, and the position of the mouse cursor in a state where the user does not perform the click operation is the threshold or less.

The contour extraction unit 106 extracts a contour of the object in the processing range determined by the processing range determination unit 105. Various known technologies can be used as processing for extracting the contour.

The display unit 107 is a device that displays various images, and can be configured with a liquid crystal display device, or the like, for example. The data recording unit 108 is a device that records various data, and can be configured with a hard disk drive (HDD) or a recording medium such as a flash memory, for example.

Figure 7:
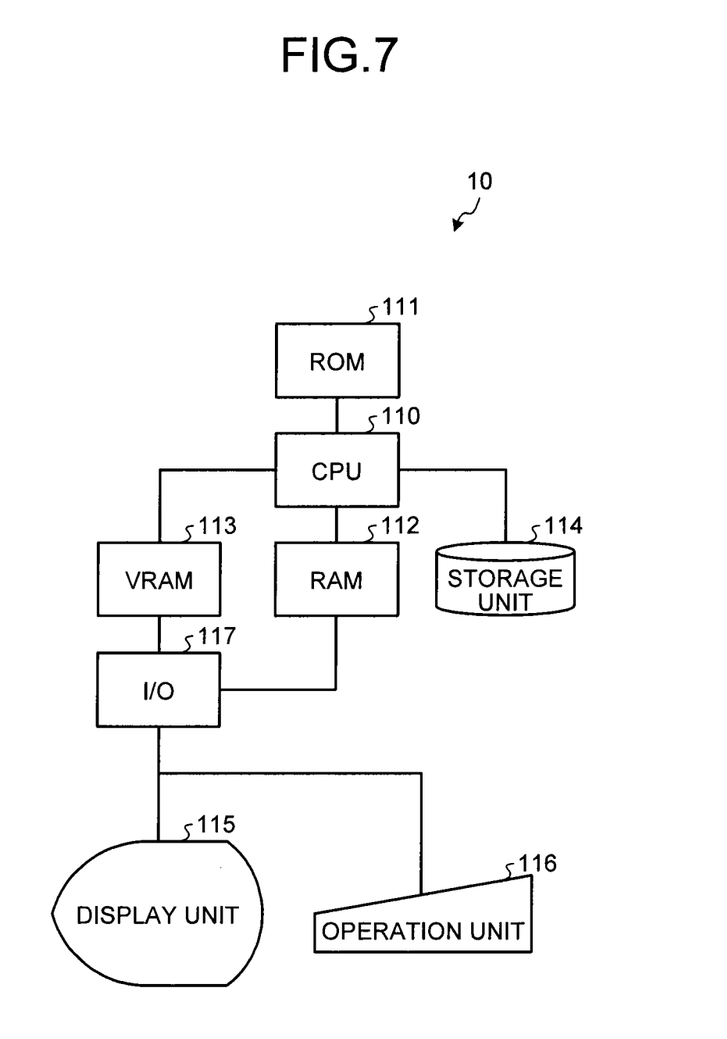
FIG. 7 is a diagram illustrating an example of a hardware configuration of the host device.

FIG. 7 is a diagram illustrating an example of a hardware configuration of the host device 10. As illustrated in FIG. 7, the host device 10 includes a central processing unit (CPU) 110, memories such as a ROM 111, a RAM 112, and a VRAM 113, a storage unit 114 such as an HDD, a display unit 115 such as a display, an operation unit 116 such as a keyboard or a mouse, and an input/output interface I/O 117, and has a hardware configuration using a normal computer.

In the present embodiment, the CPU 110 reads a program stored in the ROM 111 or the like to the RAM 112, and executes the program, thereby to realize the functions of the data input unit 102, the operation control unit 103, and the contour extraction control unit 104 (the processing range determination unit 105 and the contour extraction unit 106) described above. However, the configuration is not limited to the above embodiment, and for example, at least a part of the data input unit 102, the operation control unit 103, and the contour extraction control unit 104 may be realized by a dedicated hardware circuit (for example, a semiconductor integrated circuit, or the like). Further, in this example, the operation unit 101 is realized by the operation unit 116, and the display unit 107 is realized by the display unit 115. Further, the data recording unit 108 can be realized by the storage unit 114, or the like.

Note that the program executed by the CPU 110 may be provided by being recorded in a computer-readable recording medium such as a CD-ROM, a flexible disk (FD), a CD-R, or a digital versatile disk (DVD) with a file in an installable format or an executable format.

Further, the program executed by the CPU 110 may be stored on a computer connected to a network such as the Internet, and may be provided by being downloaded through the network. Further, the control program executed by the CPU 110 may be provided or distributed through the network such as the Internet.

Figure 8:
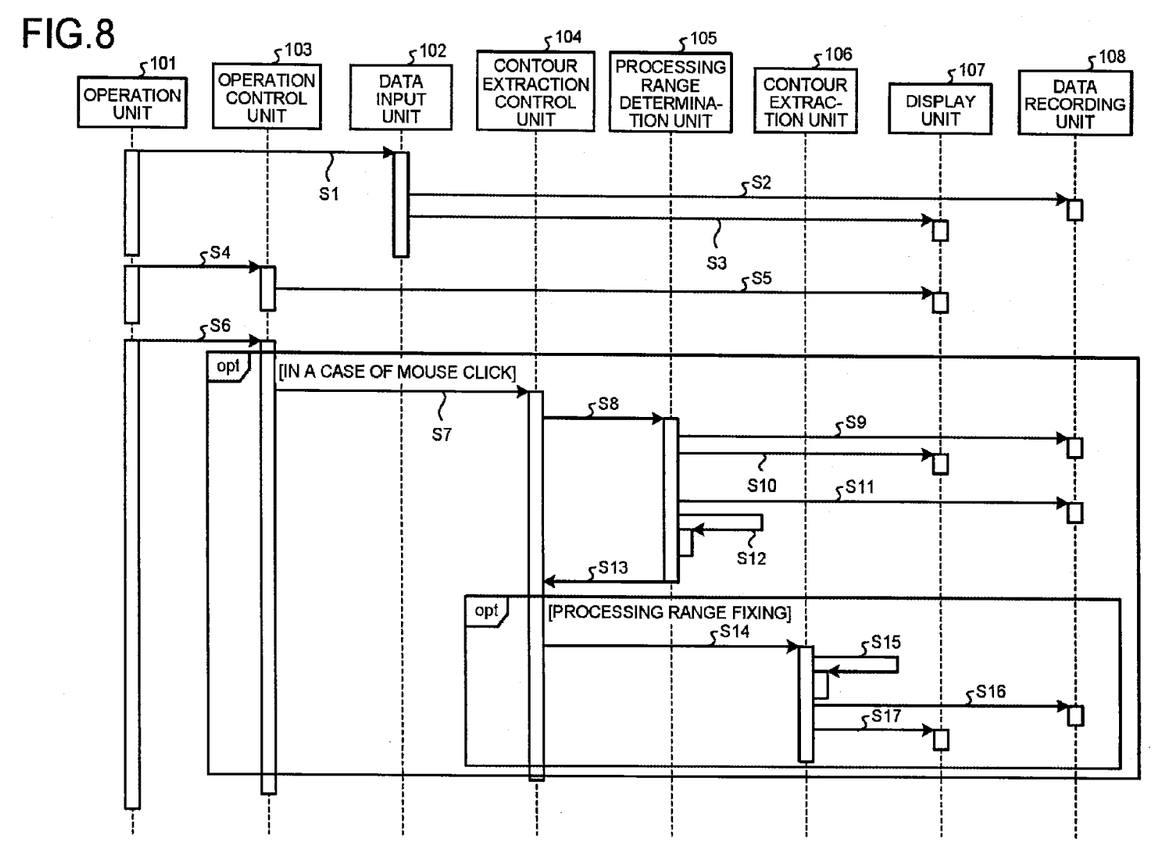
FIG. 8 is a sequence diagram illustrating an example of an operation procedure of the host device.

FIG. 8 is a sequence diagram illustrating an example of an operation procedure of the host device 10. First, when having received an operation of specifying the image data for color plate (image data to be processed) stored in a memory (not illustrated) through the operation unit 101 (step S1), the data input unit 102 reads the specified image data for color plate from the memory (not illustrated), and records the read image data for color plate in the data recording unit 108 (step S2). Further, the data input unit 102 performs control of converting the read image data for color plate into preview display data in a data format that can be treated in the display unit 107, and displaying the converted data in the display unit 107 (step S3).

Next, when having received an operation of pressing the button image (not illustrated) for selecting the object specifying application through the operation unit 101 (step S4), the operation control unit 103 performs control of displaying the UI image related to the object specifying application in the display unit 107 (step S5). At this time, the object specifying application is started (executed). Next, when having received the click operation of the mouse through the operation unit 101 (step S6), the operation control unit 103 notifies the event information including operation information that identifies the click operation of the mouse and the specified position information (information indicating the position clicked with the mouse) to the contour extraction control unit 104 (step S7). The contour extraction control unit 104 that has received the event information transmits the received event information to the processing range determination unit 105, and requests the processing range determination unit 105 to perform processing of determining the processing range (step S8).

The processing range determination unit 105 that has received the request performs control of recording the event information received by the contour extraction control unit 104 in step S7, in the data recording unit 108 (step S9), and then displaying the processing range in the display unit 107 (step S10). Further, the processing range determination unit 105 acquires the start point position from the data recording unit 108 (step S11), and determines whether determining (fixing) the processing range based on the acquired start point position and the position (the latest clicked position) indicated by the specified position information included in the event information received by the contour extraction control unit 104 in step S7 (step S12). Detailed content will be described below. The processing range determination unit 105 then transmits information indicating whether having fixed the processing range, to the contour extraction control unit 104 (step S13). Further, as described below, the processing range determination unit 105 performs control of changing the display of the mouse cursor according to a relationship between the start point position and the position of the mouse cursor.

In step S13, when having received the information indicating that the processing range has been fixed, from the processing range determination unit 105, the contour extraction control unit 104 requests the contour extraction unit 106 to perform contour extraction (step S14). The contour extraction unit 106 that has received the request performs contour extraction processing of extracting a contour of the object in the processing range determined by the processing range determination unit 105 (step S15), records information indicating a result of the extraction, in the data recording unit 108 (step S16), and then performs control of displaying the extraction result in the display unit 107 (step S17).

Figure 9:
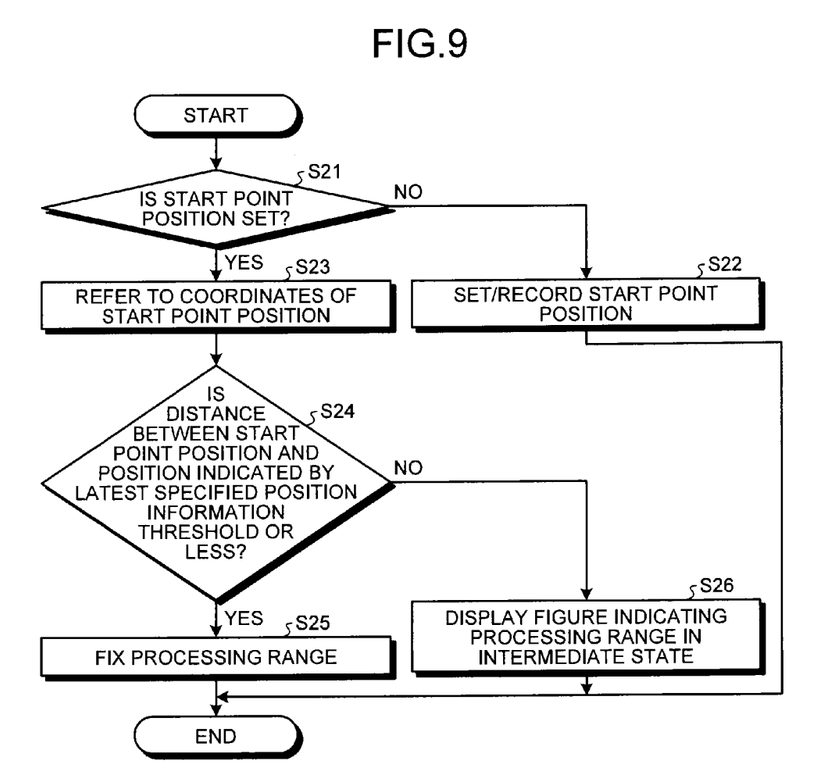
FIG. 9 is a flowchart illustrating an example of processing by a processing range determination unit.

FIG. 9 is a flowchart illustrating an example of processing of determining the processing range by the processing range determination unit 105. In this example, timing at which an execution request of processing of determining the processing range has been received together with the event information from the contour extraction control unit 104 (step S8 illustrated in FIG. 8) is start timing. As illustrated in FIG. 9, first, the processing range determination unit 105 determines whether the start point position is set (step S21). When the start point position is not set (No in step S21), the processing range determination unit 105 sets the position indicated by the specified position information included in the event information received from the contour extraction control unit 104, as the start point position, and records the start point position in the data recording unit 108 (step S22).

Figure 10:
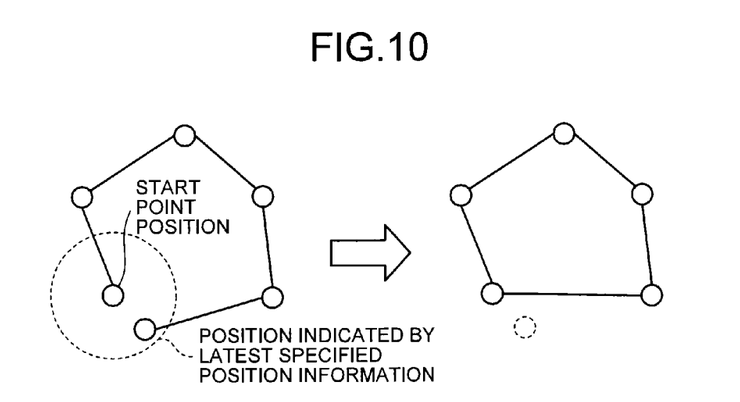
FIG. 10 is a diagram for describing a complementary function of when a processing range is fixed.

Meanwhile, when the start point position is set (Yes in step S21), the processing range determination unit 105 refers to coordinates of the start point position recorded in the data recording unit 108 (step S23). Further, the processing range determination unit 105 records the event information received from the contour extraction control unit 104 in the data recording unit 108. Then, the processing range determination unit 105 confirms whether a distance between the start point position, and the position (coordinates) indicated by the specified position information (the latest specified position information) included in the event information received from the contour extraction control unit 104 is a threshold or less (step S24). When the distance between the start point position and the position indicated by the latest specified position information is the threshold or less (Yes in step S24), the processing range determination unit 105 fixes the processing range (step S25). Specifically, the processing range determination unit 105 replaces the position indicated by the latest specified position information with the start point position, and then determines (fixes) a closed area obtained by linking from the start point position to positions indicated by the specified position information received until receiving the latest specified position information, in sequence, as the processing range. For example, as illustrated in FIG. 10, when the start point position and the position indicated by the latest specified position information are not strictly matched, the position indicated by the latest specified position information is replaced with the start point position (in a different point of view, the start point position is regarded as an end point position), and the closed area obtained by linking the positions indicated by the specified position information received so far, using the start point position as the start point and the end point position, in sequence, is fixed as the processing range.

That is, according to the present embodiment, when the user performs work of roughly surrounding the object in order to specify the object to which the user wishes to provide a gloss effect, it is not necessary to strictly match the start point position and the end point position, and therefore, an advantageous effect of improving the work efficiency of the user can be achieved.

Referring back to FIG. 9, and description will be continued. In step S24 described above, when the distance between the start point position, and the position indicated by the latest specified position information exceeds the threshold (No in step S24), the processing range determination unit 105 performs control of displaying a figure (a figure indicating the processing range in an intermediate state before fixing) obtained by linking from the start point position to the positions indicated by the specified position information received until receiving the latest specified position information, in sequence, in the display unit 107 (step S26).

Next, an example of processing by the processing range determination unit 105 in a state where the user is performing an operation of moving the mouse cursor without performing the click operation (without performing the operation of specifying an arbitrary position on the target image) will be described with reference to FIG. 11. In the description below, the operation of moving the mouse cursor without performing the click operation may be referred to as "move operation". In this example, the processing range determination unit 105 performs control of changing the display of the mouse cursor according to the relationship between the start point position and the position of the mouse cursor in a state where the user does not perform the click operation.

In this example, when having received the move operation through the operation unit 101, the operation control unit 103 notifies the contour extraction control unit 104 of the event information including operation information that identifies the move operation and input position information that indicates the position of the mouse cursor in a state where the user does not perform the click operation. The contour extraction control unit 104 that has received the event information transmits the received event information to the processing range determination unit 105, and requests the processing range determination unit 105 to perform processing of determining the display of the mouse cursor. Timing at which the execution request of the processing of determining the display of the mouse cursor has been received together with the event information from the contour extraction control unit 104 is start timing of the flow of FIG. 11.

Figure 11:
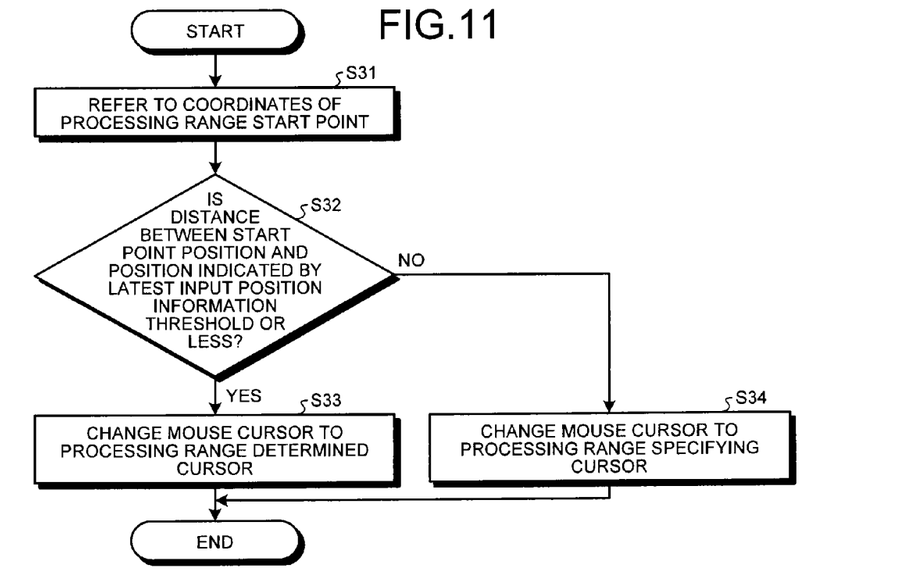
FIG. 11 is a flowchart illustrating an example of processing by the processing range determination unit.

As illustrated in FIG. 11, first, the processing range determination unit 105 refers to coordinates of the start point position recorded in the data recording unit 108 (step S31). Next, the processing range determination unit 105 confirms whether a distance between the start point position, and the position (the coordinates) indicated by the input position information (latest input position information) included in the event information received from the contour extraction control unit 104 is a threshold or less (step S32). When the distance between the start point position, and the latest input position information is the threshold or less (Yes in step S32), the processing range determination unit 105 performs processing of changing the mouse cursor to a processing range fixed cursor (step S33). Meanwhile, when the distance between the start point position, and the latest input position information is not the threshold or less (No in step S32), the processing range determination unit 105 performs control of changing the mouse cursor to a processing range specifying cursor (step S34).

Figure 12:
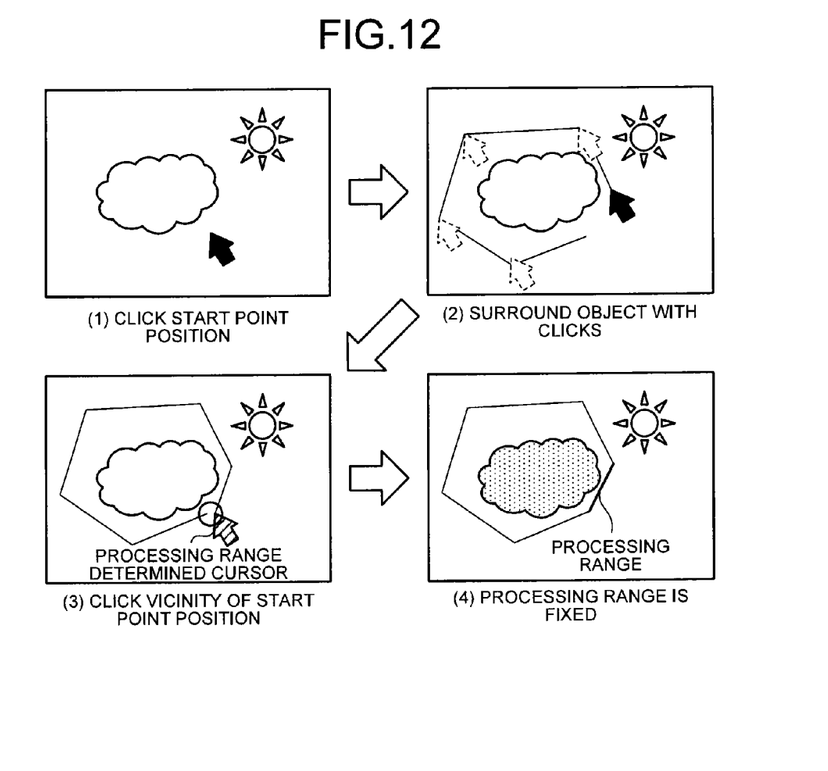
FIG. 12 is a diagram schematically illustrating an operation of when work for specifying a processing range of contour extraction processing is performed.

FIG. 12 is a diagram schematically illustrating an operation of when the user performs work of roughly surrounding the object to be specified (work for specifying the processing range of the contour extraction processing) in order to specify the object to which the user wishes to provide a gloss effect in the specified image data for color plate. First, the user operates the mouse to move the mouse cursor to a position, which the user wishes to have as the start point of the processing range, of an image (target image) indicated by the image data for color plate, and performs the click operation, thereby to specify the position. Following that, the user sequentially performs an operation of clicking the mouse while moving the mouse cursor such that a clicked position of the mouse surrounds the object to be specified. Then, when a distance between the position of the mouse cursor that moves according to the move operation, and the start point position becomes a threshold or less, the mouse cursor is changed from the processing range specifying cursor to the processing range determined cursor. When the click operation of the mouse is performed in this state, even when the start point position and the latest clicked position are not strictly matched, as described above, the latest clicked position is replaced with the start point position, and the closed area obtained by linking the clicked positions so far in sequence is fixed as the processing range.

Note that, for example, in the above embodiments, the configuration to generate the original copy data in which the information of the special color plate (image data for special color plate) is added to the image data for color plate has been described as an example. However, a configuration to which the present invention can be applied is not limited to the configuration, and for example, may be a configuration in which the image data for special color plate is not generated.

Hereinafter, modifications will be described.

(1) First Modification

Figure 13:
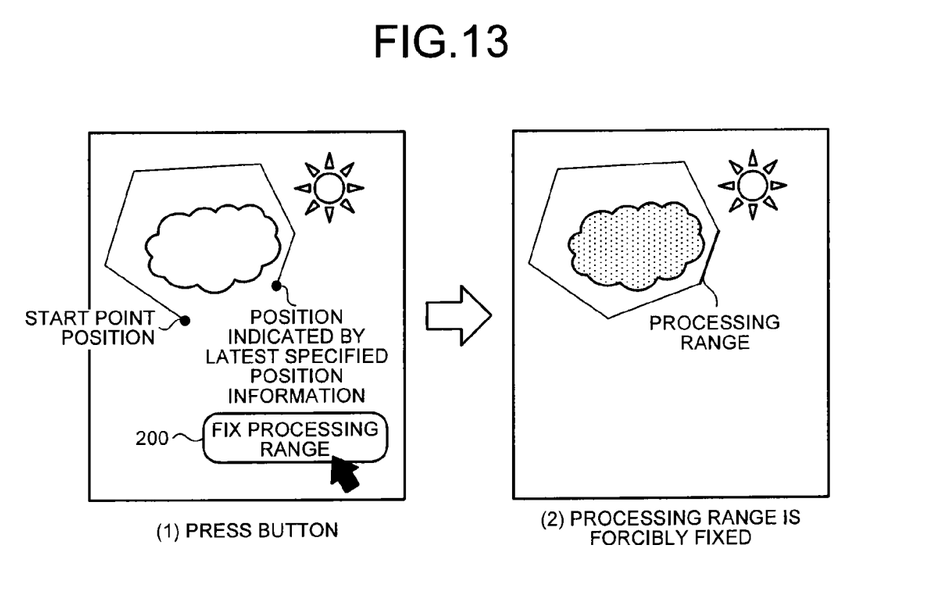
FIG. 13 is a schematic diagram describing a method of determining a processing range in a modification.

For example, when having received a fixing instruction that instructs fixing of a processing range, a processing range determination unit 105 may be able to determine a closed area obtained by linking from a start point position to positions indicated by position information received until receiving latest specified position information, in sequence, and by linking the position indicated by the latest specified position information and the start point position, as a processing range. For example, as illustrated in FIG. 13, a configuration may be employed, in which a button image 200 for instructing fixing of the processing range is displayed in a display unit 107, and a user operates a mouse to move a mouse cursor to a position overlapped with the button image 200, and performs a click operation, thereby to input a fixing instruction.

For example, when having received a mouse operation of pressing the button image 200, an operation control unit 103 may notify a contour extraction control unit 104 of the fixing instruction. The contour extraction control unit 104 that has received the notification requests the processing range determination unit 105 to fix the processing range. Then, as illustrated in FIG. 13, the processing range determination unit 105 that has received the request may forcibly determine (fix) a closed area obtained by linking from the start point position to positions indicated by the specified position information received until receiving the latest specified position information, in sequence, and by linking the position indicated by the latest specified position information and the start point position, as the processing range, even if a distance between the start point position, and the position indicated by the latest specified position information exceeds a threshold.

(2) Second Modification

Further, for example, when a distance between a start point position, and a position indicated by latest specified position information exceeds a threshold, and a no-operation period that indicates a period in which an operation by a user is not performed exceeds a predetermined period, a processing range determination unit 105 may determine a closed area obtained by linking from the start point position to positions indicated by specified position information received until receiving the latest specified position information, in sequence, and by linking the position indicated by the latest specified position information and the start point position, as a provisional processing range, and a contour extraction unit 106 may perform control of extracting a contour of an object in the provisional processing range, and notifying of a result of the extraction.

Figure 14:
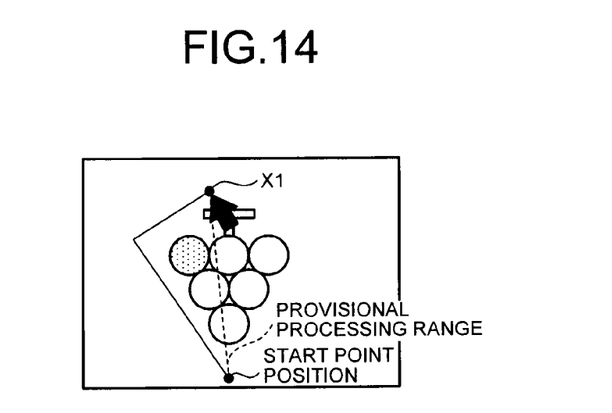
FIG. 14 is a schematic diagram for describing a method of determining a provisional processing range in a modification.

For example, as illustrated in FIG. 14, when a distance between the start point position, and a latest clicked position X1 exceeds a threshold, and the no-operation period has been continued for a predetermined period, the processing range determination unit 105 determines a closed area obtained by linking the start point position to clicked positions received until receiving the latest clicked position X1, in sequence, and by linking the latest clicked position X1 and the start point position, as the provisional processing range. Then, the contour extraction unit 106 performs control of extracting a contour of an object in the provisional processing range, and displaying a result of the extraction in a display unit 107.

Figure 15:
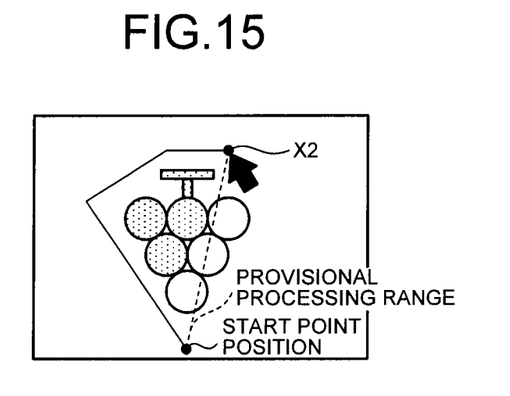
FIG. 15 is a schematic diagram for describing a method of determining a provisional processing range in a modification.

Further, as illustrated in FIG. 15, when a distance between the start point position, and a latest clicked position X2 exceeds a threshold, and the no-operation period has been continued for a predetermined period, the processing range determination unit 105 determines a closed area obtained by linking from the start point position to clicked positions received until receiving the latest clicked position X2, in sequence, and by linking the latest clicked position X2 and the start point position, as the provisional processing range. Then, the contour extraction unit 106 performs control of extracting a contour of an object in the provisional processing range, and displaying a result of the extraction in the display unit 107.

Figure 16:
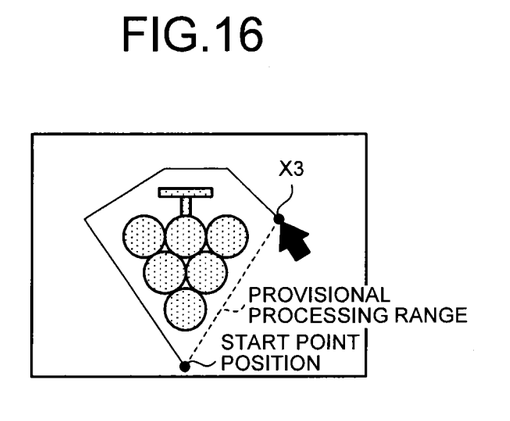
FIG. 16 is a schematic diagram for describing a method of determining a provisional processing range in a modification.

Further, as illustrated in FIG. 16, when a distance between the start point position, and a latest clicked position X3 exceeds a threshold, and the no-operation period has been continued for a predetermined period, the processing range determination unit 105 determines a closed area by linking from the start point position to clicked positions received until receiving the latest clicked position X3, in sequence, and by linking the latest clicked position X3 and the start point position, as the provisional processing range. Then, the contour extraction unit 106 performs control of extracting a contour of an object in the provisional processing range, and displaying a result of the extraction in the display unit 107.

Figure 17:
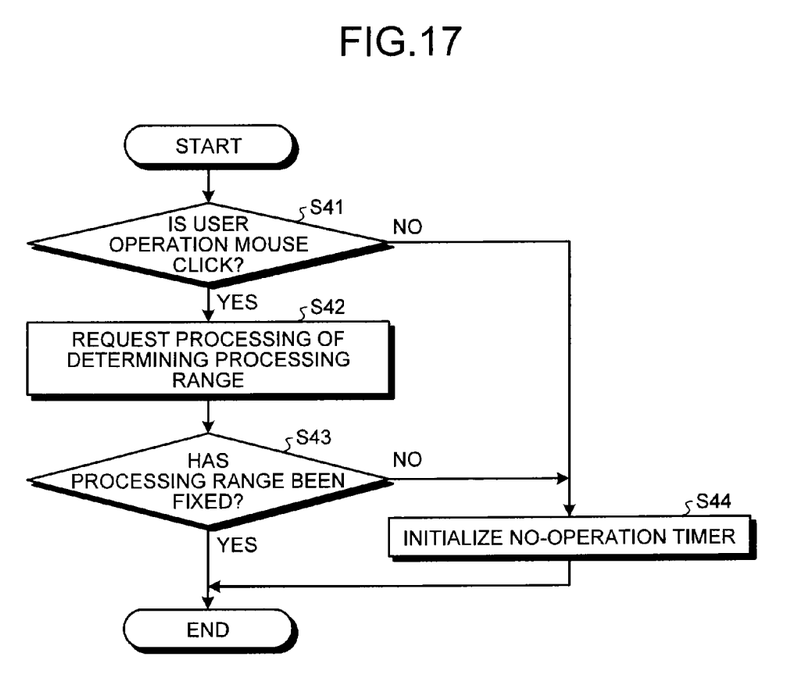
FIG. 17 is a flowchart illustrating an example of processing by a contour extraction control unit in a modification.

FIG. 17 is a flowchart illustrating an example of processing by the contour extraction control unit 104 of the present modification. In the example of FIG. 17, timing at which an object specifying application is executed and a user operation is performed, in a state where an image indicated by image data for color plate (image data to be processed) specified by the user is displayed (in a state where a screen exemplarily illustrated in FIG. 6 is displayed) is start timing. First, the contour extraction control unit 104 confirms whether the user operation is mouse click (step S41). For example, the contour extraction control unit 104 can confirm whether the user operation is mouse click by confirming whether operation information (information that identifies a type of the operation) included in event information received from an operation control unit 103 indicates the mouse click.

When the user operation is the mouse click (Yes in step S41), the contour extraction control unit 104 transmits the event information received from the operation control unit 103 to the processing range determination unit 105, and requests the processing range determination unit 105 to perform processing of determining the processing range (step S42). The processing range determination unit 105 that has received the request executes processing in accordance with the flow illustrated in FIG. 9. The contour extraction control unit 104 then receives information indicating whether the processing range has been fixed, from the processing range determination unit 105, and refers to the information and confirms whether the processing range has been fixed (step S43). When the processing range has been fixed (Yes in step S43), the processing by the contour extraction control unit 104 is terminated. Meanwhile, when the processing range has not been fixed (No in step S43), or when the user operation is an operation (for example, a move operation, or the like) other than the mouse click operation in step S41 (No in step S43), the contour extraction control unit 104 initializes a no-operation timer for timing the period in which the no-operation is continued (step S44).

Figure 18:
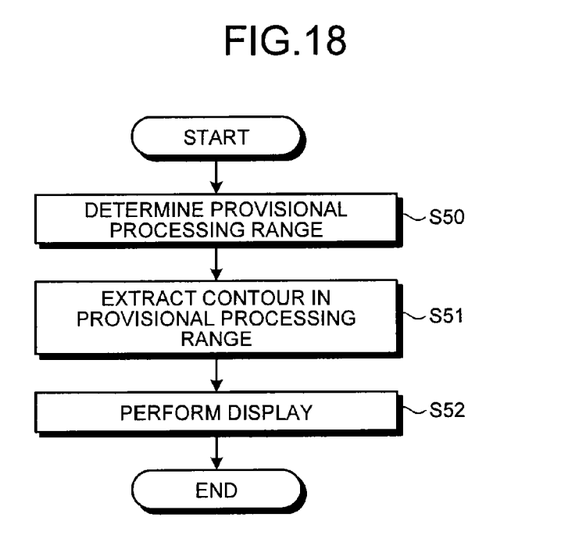
FIG. 18 is a flowchart illustrating an operation example of when interruption with a no-operation timer has occurred in a modification.

Next, an operation example of when interruption by the no-operation timer has occurred, that is, when the no-operation period has exceeded the predetermined period in a state where the processing range has not been fixed will be described with reference to FIG. 18. When interruption by the no-operation timer initialized in step S44 illustrated in FIG. 17 has occurred, the processing range determination unit 105 determines a closed area obtained by linking from the start point position to positions indicated by the specified position information received until current timing, in sequence, and by linking the position indicated by the latest specified position information and the start point position, as the provisional processing range (step S50). In this example, the interruption by the no-operation timer is controlled with a flag such that the interruption occurs only once, after the initialization of step S44 illustrated in FIG. 17. Next, the contour extraction unit 106 extracts a contour of an object in the provisional processing range (step S51), and performs control of displaying a result of the extraction in the display unit 107 (step S52).

(3) Third Modification

In the above embodiment, the user operates the mouse to move the mouse cursor to an arbitrary position on the target image, and performs the click operation, thereby to specify the arbitrary position. However, the operation to specify a position on the target image is not limited to the embodiment. For example, the user moves a mouse cursor to an arbitrary position on a target image and presses a button of the mouse (a left button or a right button), and performs a drag operation of moving the mouse cursor while pressing the button of the mouse, thereby to continuously specify positions corresponding to the moving mouse cursor, of a target image.

Note that the above modifications can be arbitrarily combined. Further, the embodiments and the modifications can be arbitrarily combined.

According to the present invention, the work efficiency of when the processing range of the contour extraction processing is determined can be improved.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing device comprising:
a receiving unit configured to receive specified position information indicating a position specified by a user with respect to a target image;
a processing range determination unit configured to determine, when a distance between a start point position indicating a start point of positions indicated by the specified position information sequentially received in the receiving unit, and a position indicated by latest specified position information is a threshold or less, a closed area obtained based on a history of the received specified position information, as a processing range; and
a contour extraction unit configured to extract a contour of an object in the processing range,
wherein when the distance between the start point position, and the position indicated by the latest specified position information is the threshold or less, the processing range determination unit replaces the position indicated by the latest specified position information with the start point position.

2. The information processing device according to claim 1, wherein, when the distance between the start point position, and the position indicated by the latest specified position information is the threshold or less, the processing range determination unit determines a closed area obtained by linking from the start point position to positions indicated by the specified position information received until receiving the latest specified position information, in sequence, as the processing range.

3. The information processing device according to claim 1, wherein, when a distance between the start point position, and a position currently pointed at by the user, of the target image, is the threshold or less, the processing range determination unit performs control of notifying a fact that the distance is the threshold or less.

4. The information processing device according to claim 1, wherein, when the processing range determination unit has received a fixing instruction that instructs fixing of the processing range, the processing range determination unit determines a closed area obtained by linking from the start point position to positions indicated by the specified position information received until receiving the latest specified position information, in sequence, and by linking the position indicated by the latest specified position information and the start point position, as the processing range.

5. The information processing device according to claim 1, wherein, when the distance between the start point position and the position indicated by the latest specified position information exceeds the threshold, and a no-operation period indicating a period in which an operation by the user is not performed exceeds a predetermined period, the processing range determination unit determines a closed area obtained by linking from the start point position to positions indicated by the specified position information received until receiving the latest specified position information, in sequence, and by linking the position indicated by the latest specified position information and the start point position, as a provisional processing range, and
the contour extraction unit performs control of extracting a contour of an object in the provisional processing range, and notifying of a result of the extraction.

6. A method of processing information comprising:
a receiving step of receiving specified position information indicating a position specified by a user with respect to a target image;
a determining step of, when a distance between a start point position indicating a start point of positions indicated by the specified position information sequentially received in the receiving step, and a position indicated by latest specified position information is a threshold or less, determining a closed area obtained based on a history of the received specified position information, as a processing range; and a contour extracting step of extracting a contour of an object in the processing range, wherein when the distance between the start point position, and the position indicated by the latest specified position information is the threshold or less, the determining step replaces the position indicated by the latest specified position information with the start point position.

7. A non-transitory computer-readable recording medium that stores therein a computer program for outputting information, the computer program for causing a computer to execute:

receiving specified position information indicating a position specified by a user with respect to a target image;

determining, when a distance between a start point position indicating a start point of positions indicated by the specified position information sequentially received at the receiving, and a position indicated by latest specified position information is a threshold or less, a closed area obtained based on a history of the received specified position information, as a processing range; and extracting a contour of an object in the processing range, wherein when the distance between the start point position, and the position indicated the latest specified position information is the threshold or less, the determining replaces the position indicated by the latest specified position information with the start point position.

\* \* \* \* \*